United States Patent

Hachisuka et al.

[11] Patent Number: 5,859,182
[45] Date of Patent: Jan. 12, 1999

[54] FLUORINE-CONTAINING POLYQUINAZOLONE POLYMER AND SEPARATION MEMBRANE USING THE SAME

[75] Inventors: Hisao Hachisuka; Kenichi Ikeda, both of Osaka, Japan

[73] Assignee: Nitto Denko Corporation, Osaka, Japan

[21] Appl. No.: 803,981

[22] Filed: Feb. 21, 1997

[30] Foreign Application Priority Data

Feb. 23, 1996 [JP] Japan .................................. 8-036435

[51] Int. Cl.⁶ .......................... C08G 73/24; C08G 73/06
[52] U.S. Cl. ........................ 528/401; 528/422; 528/423; 55/16; 55/528; 210/500.27; 210/500.28; 210/500.38
[58] Field of Search ..................... 528/401, 422, 528/423; 55/16, 528; 210/500.27, 500.28, 500.38

[56] References Cited

U.S. PATENT DOCUMENTS

| | | | |
|---|---|---|---|
| 4,354,017 | 10/1982 | Abe et al. | 528/172 |
| 4,529,493 | 7/1985 | Abe et al. | 528/423 |
| 4,959,151 | 9/1990 | Nakatani et al. | 210/640 |
| 4,964,887 | 10/1990 | Shimatani et al. | |
| 4,988,371 | 1/1991 | Jeanes et al. | |
| 5,042,992 | 8/1991 | Blinka et al. | 55/16 |

FOREIGN PATENT DOCUMENTS

| | | |
|---|---|---|
| 47-51715 | 12/1972 | Japan . |
| 57-159505 | 10/1982 | Japan . |
| 58-37024 | 3/1983 | Japan . |
| 60-75310 | 4/1985 | Japan . |
| 5-7749 | 1/1993 | Japan . |

OTHER PUBLICATIONS

"New Linear Heterocyclic Polymers: Polypyrimidone-quinazolones", *J. Appl. Polym. Sic.*, vol. 60, Issue 169 (1962), pp. S59–S63.

*Primary Examiner*—Duc Truong
*Attorney, Agent, or Firm*—Merchant, Gould, Smith, Edell, Welter & Schmidt

[57] ABSTRACT

A fluorine-containing polyquinazolone polymer having a bisquinazolone unit represented by Formula 1 as the repeating unit is used for a gas separation membrane so that great chemical and heat resistance is provided. The membrane also has great permeability and effective separability, as well as excellent mechanical strength.

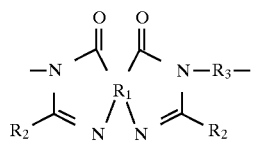

Formula 1 where $R_1$ indicates a tetravalent organic group, $R_2$ respectively indicate an alkyl group or an aromatic group, $R_3$ indicates a divalent organic group, and $R_1$ and/or $R_3$ indicates an organic group having at least one fluorine atom.

6 Claims, 2 Drawing Sheets

FLUORINE-CONTAINING POLYQUINAZOLONE POLYMER AND SEPARATION MEMBRANE USING THE SAME

FIELD OF THE INVENTION

This invention relates to a fluorine-containing polyquinazolone polymer and a separation membrane using the same. More specifically, this invention relates to a fluorine-containing polyquinazolone polymer which is used to separate and condense particular components such as hydrogen, methane, carbon dioxide, oxygen, nitrogen and water vapor, from a mixture of gases for industrial use.

BACKGROUND OF THE INVENTION

Polyimide is well known as a separation membrane material which is excellent in heat resistance, chemical resistance and other properties, since polyimide has a high glass transition point and a rigid molecular chain structure. Separation membranes using various kinds of polyimides have been disclosed. For example, U.S. Pat. No. 4,959,151 discloses aromatic polyimide using biphenyltetracarboxylic acid dianhydride. Published Unexamined Japanese Patent Application (JPA) No. 5-7749, U.S. Pat. No. 5,042,992 and others disclose fluorine-containing aromatic polyimide. Polyimides using aliphatic and alicyclic tetracarboxylic acid dianhydride are disclosed in U.S. Pat. Nos. 4,964,887 and 4,988,371.

Polyquinazolone polymers are also developed in order to improve the performance of polyimides (see Published Examined JPA No. 61-51934, Published Unexamined JPA No. 60-75310, and *Journal of Polymer Science* Vol. 60, 1962). A polyquinazolone polymer material is excellent in chemical and heat resistance, mechanical strength, and film-forming property. However, permeability of such a conventional polyquinazolone polymer was too low to be used for a separation membrane, and thus, such a separation membrane did not reach the level of a practical separation performance.

Poly(dimethylsiloxane), which is a highly permeable membrane material, has an oxygen permeability coefficient of about $10^{-8}[cm^3(STP)cm/cm^2/sec/cmHg]$, and is the best of the known polymer membranes. This membrane, however, is inferior in separability, and unpractical in view of its equipment and cost. This membrane must be made comparatively thick since it is not mechanically strong. Therefore, permeation speed cannot be improved by providing a thinner membrane. Though Published Examined JPA No. 47-51715 discloses an oxygen enrichment membrane comprising poly(vinyl trimethylsilane) for a highly permeable membrane material, the membrane is inferior in chemical resistance and it easily deteriorates due to air pollutants, pump oil etc., and its heat resistance is not satisfactory either.

As mentioned above, a membrane comprising a polyquinazolone polymer has chemical resistance, heat resistance, mechanical strength and film-forming property as much as a polyimide separation membrane has. However, a conventional polyquinazolone polymer does not have properties applicable for a separation membrane. That is, its permeability is too low for a practical use.

SUMMARY OF THE INVENTION

This invention aims to solve the above-mentioned problems. More specifically, this invention provides a superior permeability by adding fluorine atoms to the repeating unit in the polyquinazolone polymer. In other words, this invention aims to provide a fluorine-containing polyquinazolone polymer which has also high permeability and separability enough for a practical use, and has excellent chemical resistance, heat resistance, mechanical strength, and film-forming property. This invention also provides a separation membrane using the polyquinazolone polymer.

In order to achieve such aims, a polyquinazolone polymer of this invention comprises a bisquinazolone unit represented by the following Formula 1.

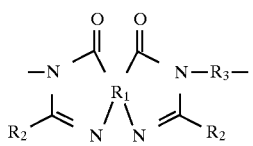

Formula 1

($R_1$ represents a tetravalent organic group, $R_2$ respectively represent alkyl groups or aromatic groups, $R_3$ represents a divalent organic group, and $R_1$ and/or $R_3$ represents an organic group having at least one fluorine atoms.)

It is preferable that $R_1$ and/or $R_3$ in Formula 1 includes at least one $-CF_3$ group.

It is preferable that $R_3$ in Formula 1 is at least one formula selected from the group consisting of the following Formulas 2–4.

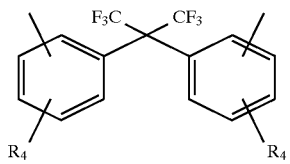

Formula 2

($R_4$ respectively represent hydrogen, an alkyl group having one to four carbons, $-OH$, $-COOH$, $-SO_3H$, or metal chlorides of $-COOH$ and $-SO_3H$.)

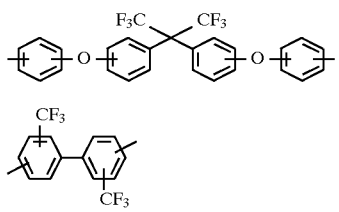

Formula 3

Formula 4

It is preferable that $R_1$ in Formula 1 is a tetravalent organic group having fluorine atoms of the structure represented by the following Formula 5.

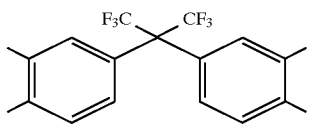

Formula 5

The separation membrane of this invention comprises a fluorine-containing polyquinazolone polymer represented by one of any of the above Formulas.

It is preferable that the separation membrane is a gas separation membrane.

The fluorine-containing polyquinazolone polymer of this invention has a bisquinazolone unit of Formula 1 as a repeating unit. A separation membrane comprising such a polymer is excellent in chemical resistance, heat resistance, and has high permeability and effective separability. The membrane is also excellent in mechanical strength. The polymer can be used for various kinds of separation membranes as well as some other purposes.

DETAILED DESCRIPTION OF THE INVENTION

Figure 1:
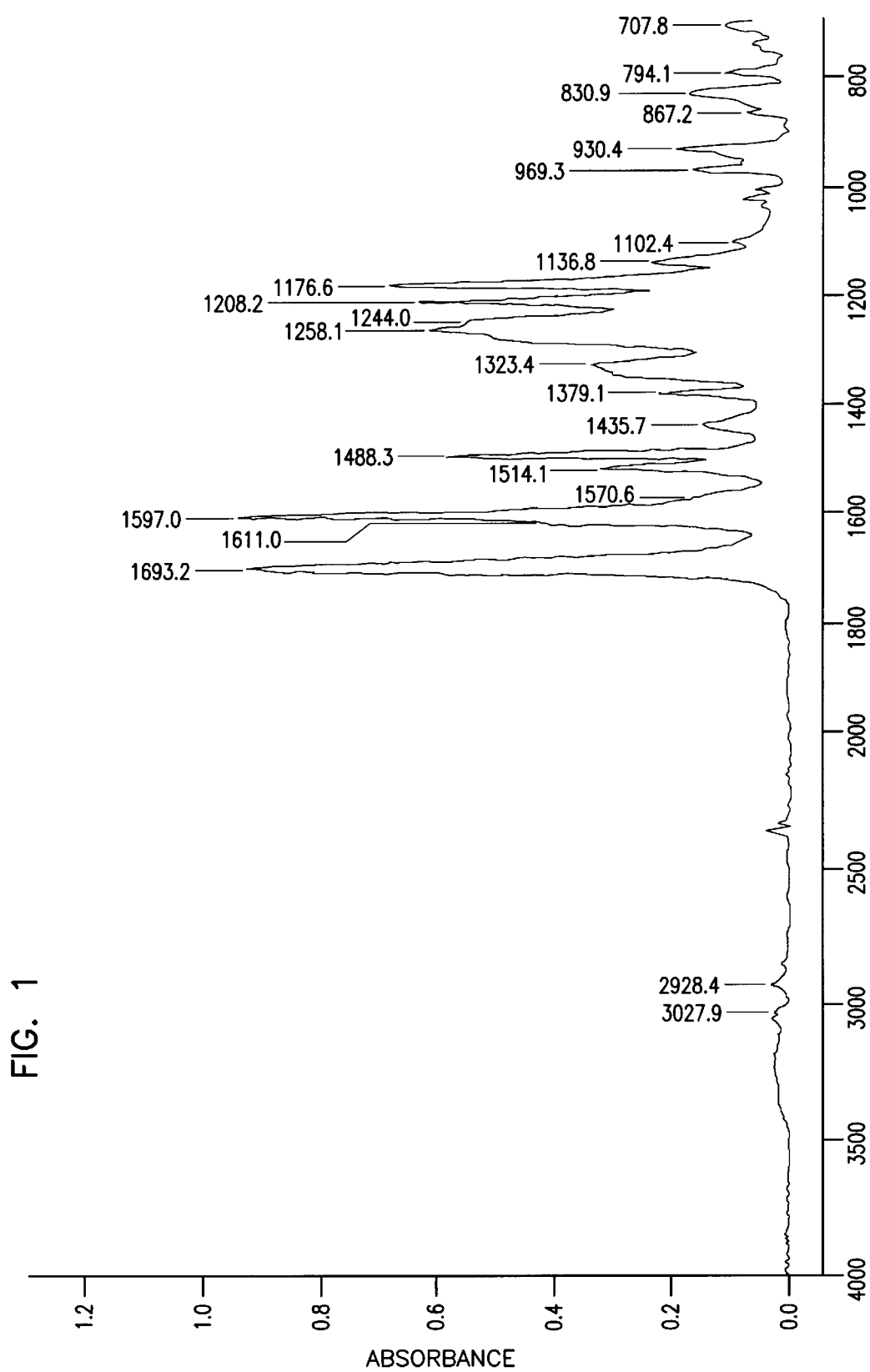
FIG. 1 is an IR chart of the polyquinazolone obtained in Example 1.

In the polyquinazolone polymer represented by Formula 1, $R_1$ is preferably a tetravalent aromatic, aliphatic, or alicyclic group. $R_1$ is preferably an aromatic group in view of its heat resistance. As a tetravalent aromatic group comprising no fluorine atom, the following Formulas 6–8 are preferred.

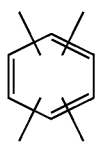

Formula 6

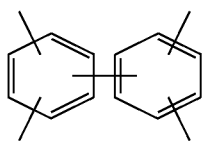

Formula 7

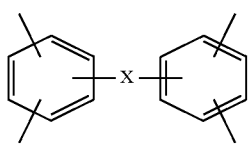

Formula 8

X is an organic bonding group which forms a tetravalent aromatic group by bonding two divalent aromatic groups, more specifically, —CH$_2$—, —C(CH$_3$)$_2$—, —CO—, —SO$_2$—, —O—, —S—, —NH—, —COO—, and —CONH— are preferably used.

As a tetravalent aromatic group comprising fluorine atoms as $R_1$, Formula 2 is preferred. In Formula 2, $R_2$ is an alkyl group or an aromatic group. Preferably, $R_2$ is an alkyl group having one to four carbons, a —CF$_3$ group, or a phenyl group. Although two $R_2$ are bonded in the repeating unit, they are not necessarily the same. $R_3$ is a divalent organic group, more specifically, a divalent aromatic, aliphatic or alicyclic group, or a divalent organic group in which these groups are bonded by at least one organic bonding Y. Formula 9 can be taken as an example of such an organic group Y.

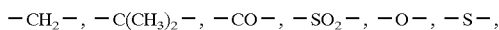

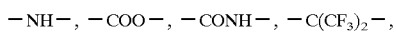

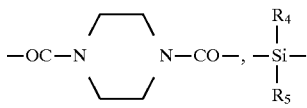

($R_4$ and $R_5$ respectively represent an alkyl group having one to ten carbons, a cycloalkyl group having three to ten carbons, or a phenyl group.)

Divalent aromatic groups comprising fluorine atoms as $R_3$ are preferably used, and such divalent aromatic groups are represented by Formulas 2–4.

As a preferable example for a polymer having a bis-quinazolone unit represented by Formula 1 as a repeating unit, the following Formulas 10 and 11 are exemplified.

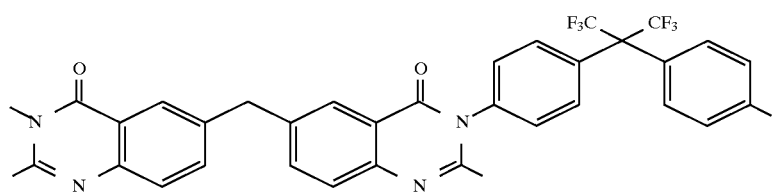

Formula 10

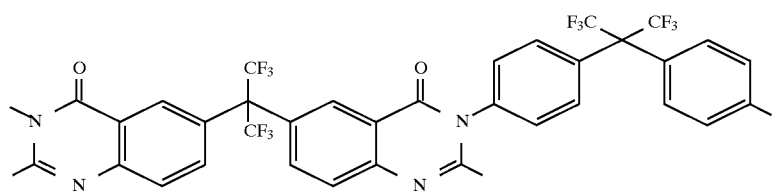

Formula 11

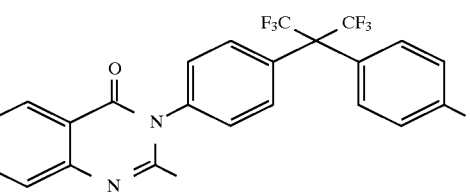

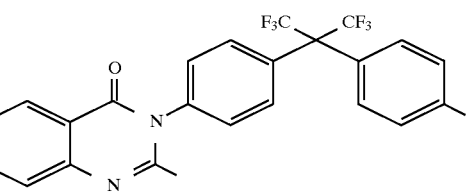

Polyquinazolone polymer having a repeating unit of Formula 1 is obtained by reacting bisoxazinone represented by following Formula 12 and diamine represented by Formula 13 in an organic solvent. The amount of the diamine is 0.95–1.08 mol, preferably about 1 mol, to 1 mol of bisoxazinone.

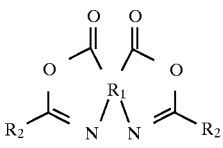

Formula 12

($R_1$ and $R_2$ are the same as in the above-described formulas.)

Formula 13

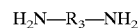

H$_2$N—R$_3$—NH$_2$ ($R_3$ is the same as in the above-described formulas.)

The following formulas 14–18 represent examples of the bisoxazinone of Formula 12. The bisoxazinone of these formulas does not contain fluorine.

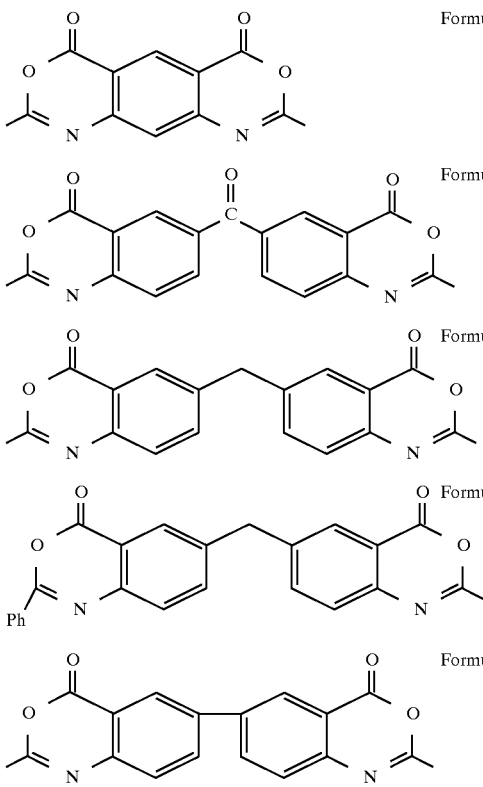

Formula 14
Formula 15
Formula 16
Formula 17
Formula 18

Formula 19 represents an example of fluorine-containing bisoxazinone.

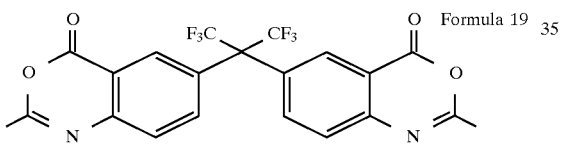

Formula 19

The diamine of Formula 13 includes: 1,4-phenylenediamine; 5-chloro-m-phenylenediamine; 3,5-diaminobenzoic acid; 1,3-phenylenediamine; 2,4-diaminotoluene; 2,5-diaminotoluene; 2,6-diaminotoluene; 1,3-diamino-4-nitrobenzene; m-phenylenediamine-4-sulfonic acid; 2,5-dimethyl-p-phenylenediamine; 2,4,6-trimethyl-1,3-phenylenediamine; 2,3,5,6-tetramethyl-1,4-phenylenediamine; 1,5-naphthalenediamine; bis(4-(4-aminophenoxy)phenyl)sulfone; bis(3-(4-aminophenyl) sulfone; α,α'-bis(4-aminophenyl)1,4-diisopropylbenzene; 4,4'-diaminodiphenylether; 3,4-diaminodiphenylether; 2,2-bis(4-(4-aminophenoxy)phenyl)hexafluoropropane; 2,2-bis (4-(4-aminophenoxy)phenyl)propane; 3,3'-dihydroxy-4,4'-diaminobiphenyl; 2,2'-dimethyl-4,4'-diaminobiphenyl; 3,3'-dimethyl-4,4'-diaminobiphenyl, 2,2-bis(3-amino-4-methylphenyl)hexafluoropropane; 3,3'-diaminobenzophenone; 9,9'-bis(4-aminophenyl)fluorene; 4,4'-bis(4-aminophenoxy)biphenyl; 1,4-bis(4-aminophenoxy)benzene; 4,4'-diaminobenzanilide; 2,2'-bis (3-amino-4-hydroxyphenyl)hexafluoropropane; 2,5-diethoxy-p-phenyldiamine; 4,4'-diaminodiphenylsulfone; 4,4'-diaminodiphenylsulfide; 4,4'-methylene-bis(2-chloroaniline); bis(4-(3-aminophenoxy)phenylsulfone; 1,3-bis(4-aminophenoxy)benzene; 2,2',5,5'-tetrachloro-4,4'-diaminobiphenyl; 3,7'-diamono-2,8-dimethyldibenzthiophensulfone; 1,4-bis(4-aminophenoxy)-2-phenylbenzene; neopentyl glycol-di-4-aminophenoxyether; 2,4-diaminophenol; 2,4-diaminoanisole; 2,4-diaminodiphenylether; m-xylenediamine; 1,3-bis(m-aminophenoxy)benzene; 3,3'-dichloro-4,4'-diaminobiphenyl; 3,3'-dimethoxy-4,4'-diaminobiphenyl; 4-chloro-m-phenylenediamine; 3,3'-dimethyl-4,4'-diaminobiphenyl-6,6'-disulfone; 4,6-diaminoresorcinol; 2,2'-diaminodiphenylsulfide; 4,4'-diaminodiphenylsulfide; 4,4'-diaminodiphenylmethane; 3,4'-diaminodiphenylmethane; 3,3'-diaminodiphenylmethane; 4,4'-diamino-3,3'-dimethyldiphenylmethane; 3,3',5,5'-tetramethylbenzidine; 3,3'-diamino-4,4'-dihydroxybiphenyl; 4,4'-diamino-1,2-diphenylmethane; n-butylene glycol-di-4-aminophenylether; n-pentyl glycol-di-4-aminophenylether; 4,4'-diaminobenzophenon; 3,3'-diethylbenzidine; 1,5-diaminoanthraquinone; 2-chloro-p-phenylendiamine; and 4,4'-diamino-p-terphenyl.

The above-noted bisoxazinone and diamine are optionally selected within the range of Formula 1. They are respectively used alone, or as a mixture thereof.

The method of manufacturing the bisoxazinone is known (see *J. Polym. Sci.*, 60, S59(1962), and *Kogyo Kagaku Zassi* (Journal of Industrial Chemistry) 73,1239 (1970)). In general, bisoxazinone is obtainable by reacting aromatic diaminodicarboxylic acid represented by Formula 20 with aliphatic carboxylic acid anhydride (Formula 21) or with aromatic carboxylic acid chloride which is represented by a formula: $R_2$—COCl ($R_2$ is the same as that mentioned above).

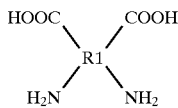

Formula 20

($R_1$ is the same as that mentioned above)

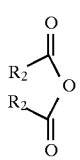

Formula 21

($R_2$ is the same as that mentioned above.)

The above aromatic diamino dicarboxylic acid includes 4,6-diaminoisophthalic acid; 2,5-diaminoisophthalic acid; 2,3-diaminoisophthalic acid; and diaminocarboxylic acid represented by the following Formula 22. The acid anhydride includes acetic anhydride, and acid chloride includes benzoyl chloride.

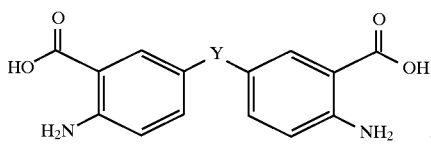

Formula 22

(Y is the same as that mentioned above.)

Although the process for the condensation reaction of the bisoxazinone and diamine is not specifically limited, the materials are preferably dissolved in a solvent and heated. The solvent should dissolve both bisoxazinone and diamine while it is inactive to these materials. Furthermore, it is preferable that the solvent also dissolves the resultant polyquinazolone polymer and maintains the reaction system in an acidic state. Preferable solvents include: N-methyl-2-pyrrolidone; dimethylformamide; dimethylacetamide; dimethyl sulfoxide; diethylene glycol dimethylether; diethylene glycol diethylether; diethylene glycol dibutylether; cresols such as p-cresol and m-cresol; chlorphenol such as p-chlorphenol and o-chlorphenol; polyphosphoric acid; and sulfonic acid. They are used alone or as a mixture thereof. A mixture of these solvents and non-polar hydrocarbon solvents such as benzene, toluene, xylene, chlorbenzene and naphtha, can be used also, if necessary. Though the amount of the solvent to the starting material is not specifically limited, it is generally 60–900 weight parts per 100 weight parts of total amount of the bisoxazinone and diamine. The bisoxazinone and diamine are reacted with each other at the temperature of from 100° to 300° C. for 5–50 hours generally, though the time and temperature for reaction depend on these materials and solvents.

It is also preferable to partially introduce Z unit as a polar unit as shown in the following Formula 23 in order to improve solubility to the solvent, film-forming property and solubility of the separation component.

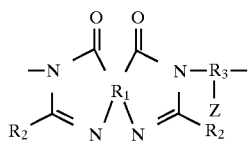

Formula 23

The polar groups include —$SO_3H$, —COOH, —OH, $NH_3$. The following organic groups represented by Formulas 24–26 are the examples of the $R_3$—Z.

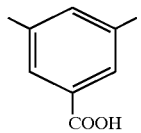

Formula 24

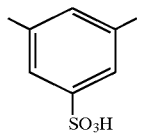

Formula 25

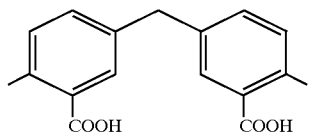

Formula 26

Polyquinazolone polymers which partially contain Formula 11 are obtained by reacting 1 mol of the above-mentioned bisoxazinone with a mixture of the above-mentioned diamine and the diamine and/or the diamine having —Z group in the organic solvent while heating. The mol ratio of the mixed diamine is 0.95–1.08 mol, or preferably about 1 mol to 1 mol of bisoxazinone. The same reaction condition can be used.

The diamines having the $R_3$—Z unit include: 3,5-diaminobenzoic acid; 4,4'-diaminodiphenylmethane-3,3'-dicarboxylic acid; 3,5-diaminobenzensulfonic acid; 3,3'-benzidinedicarboxylic acid; N,N-bis(p-aminobenzoyl)-3,5-diaminobenzoic acid; isophthal-3-amino-5-carboxyanilide; 3,3'-benzidine disulfonic acid; and 4,4'-diaminodiphenylmethane-3,3'-disulfonic acid.

Lewis acid catalyst and a phosphorus-containing dehydrating agent can be used to complete the reaction in a more preferable manner. As a Lewis acid catalyst, metal halogenides, more specifically, chlorides are preferably used. The chlorides include anhydrous stannous chloride, anhydrous cupric chloride, anhydrous cobalt chloride, anhydrous ferric chloride, and anhydrous nickel chloride.

The amount of the catalyst is 0.002–0.2 mol to 1 mol of bisoxazinone or diamine, more preferably, 0.01–0.1 mol. Excessive catalyst is not desirable since it will cause gelation. The phosphorus-containing dehydrating agents include diphosphorus pentaoxide, phosphoric acid, methaphosphoric acid, phosphorous acid, hypophosphoric acid, hypophosphorous acid, pyrophosphoric acid, and polyphosphoric acid. Among them, diphosphorus pentaoxide is preferably used. The amount of the dehydrating agent is 0.001–0.2 mol, more preferably, 0.01–0.2 mol to 1 mol of bisoxazinone. Such a dehydrating agent is effective to prevent gelation. A diamine having acid groups functions as a catalyst when it polymerizes with bisoxazinone. Accordingly, when at least one part of the diamine component is a diamine indicated as $R_3$—Z, a high molecular weight polyquinazolone polymer can be obtained without using Lewis acid catalyst.

Polymerization is conducted preferably by adding a hydrocarbon solvent which can be azeotropic with water (e.g., benzene, xylene, and toluene) to a solvent, and by removing water produced due to the polymerization from of the system by means of azeotropy. The polymerization temperature is from 150° to 200° C., the time ranges from several hours to several dozens of hours. Usual polymerization needs 100 hours at most. It is preferable in this invention that the polyquinazolone polymer having the repeating unit of Formula 1 has a limiting viscosity of 0.30–1.50, more preferably, 0.40–1.00. If the limiting viscosity is too small, self-supporting property of the separation membrane deteriorates and sufficient mechanical strength cannot be obtained. If the limiting viscosity is too great, uniform dope (film-forming solution) will difficult to obtain, and thus, film-forming is difficult. In this invention, the $R_3$-Z unit can be 0–70 mol % of the total unit. Too many $R_3$—Z units are not preferred since the strength of the formed separation membrane is not sufficient for a practical use.

The polyquinazolone polymer comprising Formula 1 is insoluble in most organic solvents except for the ones exemplified as the polymerization reaction solvents, so that the polymer has excellent chemical resistance. Moreover, this polymer has excellent heat resistance: its weight does not decrease even if heated to 450° C. Although separation membranes of this invention can be produced in various methods, they are generally provided in the following steps:

preparing a uniform film-forming solution by dissolving the polyquinazolone polymer in a film-forming solvent;

cast-coating this solution on a proper supporting substrate;

evaporating the solvent by heat-treating or heat-treating under reduced pressure, so that a uniform membrane is produced. A thinner membrane is preferred in order to raise the transmission speed. On the other hand, a thicker membrane is preferable if mechanical strength is taken into consideration. From this point of view, the membrane is preferably 0.05–30 μm thick. An aprotic polar organic solvent similar to the above polymerization reaction solvent is preferably used for film-forming.

Supporting substrates on which the dope is coated are not specifically limited. Boards having flat and smooth surfaces, which comprise glass, stainless steel, aluminum, polyethylene, polypropylene etc., can be used.

The film-forming solution is heated after it is coated on a supporting substrate. In case of the aprotic polar organic solvent, the temperature is 80° to 140° C., preferably, 100° to 120° C. It is most preferable that most solvent is evaporated in this range of temperature, and then, the residual solvent is completely evaporated by raising the temperature to the range from 150 to 170° C. Later the membrane can be peeled off from the substrate if necessary, by dipping the membrane and substrate in water.

It is also preferable to form an asymmetric membrane from the dope by using a wet phase transition film-forming method.

The wet phase transition film-forming method is explained later. The methods for manufacturing a gas separation membrane and the shape of the asymmetric membrane are not specifically limited. Asymmetric membranes of, for example, tubular shape (including hollow fiber shape) or flat type can be obtained by dipping the solvent in a solidifying solution (A) by using dope extrusion, casting, etc.

It is preferable to prepare a flat membrane by coating a dope on a permeable supporter by casting or dipping, then dipping it in the solidifying solution (A) in order to obtain an asymmetric membrane as a composite membrane, so that the mechanical strength of the membrane will be improved. The supporters of this invention include glass plate having flat and smooth surfaces and gas permeable supporters. The gas permeable supporters include porous substrates of organic, inorganic, or metallic materials, woven fabrics, and unwoven fabrics. The coating of the dope on these gas permeable supporters is 25–400 µm thick, preferably 30–200 µm thick.

The dope of this invention is used in a temperature ranging from −80° C. to 80° C., preferably −20° C. to 40° C.

The solidifying solution (A) used for dipping-removing the organic solvent is not limited as long as it is insoluble with respect to fluorine-containing polyquinazolone resin but is compatible with the above-mentioned organic solvents. For example, water, alcohols such as methanol, ethanol, isopropyl alcohol, or the mixture thereof is used. Among them, water is preferably used. Though the temperature of the solution (A) for dipping-removing the organic solvent is not especially limited, the process is preferably completed at the temperature of from 0° to 50° C.

It is preferable that the asymmetric membrane of this invention is further coated with elastomer polymer. The defects on the gas separation membrane can be prevented and the surface is hardly scratched if thin films of the elastomer polymer are laminated. The elastomer polymer is a kind of polymer that can form flexible films, which includes ethylene monomer, homopolymer or copolymer of conjugated diene monomer. The examples are polypropylene, poly(vinylchloride), ethylene-propylene copolymer, ethylene-propylene-diene copolymer, polybutadiene, polyisoprene, chloroprene rubber, poly(4-methyl-penten-1), butadiene-styrene copolymer, isoprene-isobutylene copolymer, or polyisobutylene. In addition to the monomers, copolymers containing monomer components having functional groups like acrylonitrile, methacrylate, methacrylic acid, or copolymers having both soft and hard segments are also included. Examples of the latter copolymers are polyether polyol, polyurethane polyether, polyurethane polyester, and polyamide polyether. Some other materials that are cured by a curing agent having straight and long chains are also used as the elastomer polymers. The examples are epoxy resin, ethyl cellulose, and butoxy resin. A crosslinked silicone resin is especially preferred as the elastomer polymer in this invention. Such a crosslinked silicone resin is soluble in organic solvents before it is crosslinked. However, it does not dissolve in organic solvents after crosslinking. Such a silicone resin can be manufactured in a manner disclosed in Published Unexamined JPA No. 59–225705.

The form of the element using the gas separation membrane is not limited. It will be a hollow fiber type element when it is extruded to be tubular. When it is coated on a proper supporter, it becomes spiral, flat, tubular, etc.

As mentioned above, the separation membrane of this invention has excellent chemical and heat resistance, and has great permeability and effective separability as shown in the following Examples. The membrane also is excellent in mechanical strength, so the membrane can be used for various purposes as a separation membrane.

The Examples described below do not limit this invention. In the Examples, permeant coefficient P is calculated by using the high-vacuum method at 25° C., and separation coefficient α is calculated from the permeant coefficient ratio of the gas at 25° C.

Example 1

An agitator, a nitrogen gas introducing device, a reflux condenser equipped with Dean-Stark trap and a flask were prepared. Into the flasc equipped with a jacket bath which can be heated to 250° C., 74.8 g of N-methyl-2-pyrrolidone was introduced. Anhydrous stannous chloride (600 mg:0.003 mol) as a polymerization catalyst, and 426 mg of diphosphrus pentaoxide as dehydrating agent were added and dissolved. Next, 18.4 g (0.055 mol) of bisoxazinone of the following Formula 27 and 18.4 g (0.055 mol) of diamine of Formula 28 were dissolved.

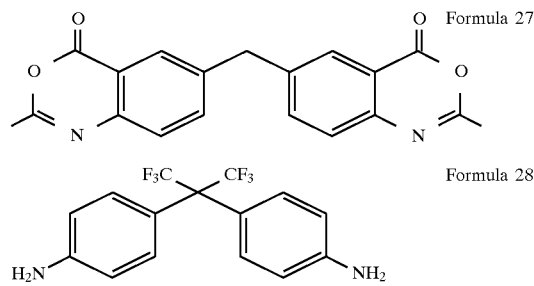

Figure 2:
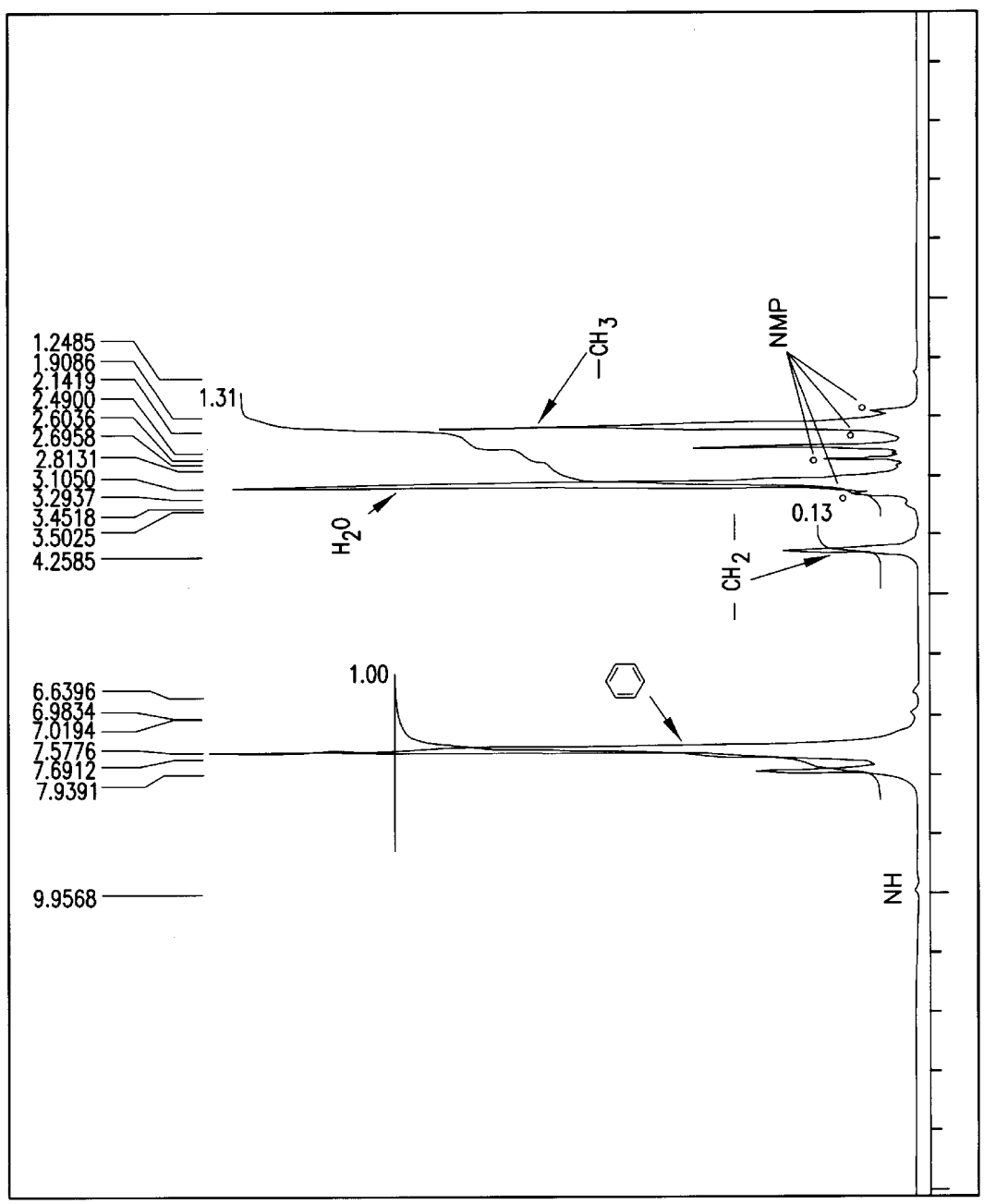
FIG. 2 is a $^1$H-NMR chart of the polyquinazolone obtained in Example 1.

A consistent polymer solution was prepared by:

adding 15 g of xylene as an azeotropic dehydrating solvent;

heating to 180° C. under nitrogen stream in order to reflux xylene; and conducting the reaction for 15 hours while successively removing the reaction-produced water by azeotropy. Polymers are solidified and deposited by introducing this polymer solution into a mass of water, and the polymer was stirred and pulverized in water by using a mixer. The powder was then filtered, and vacuum-dried for 10 hours at 60° C. in order to obtain polyquinazolone having a logarithmic viscosity of 0.71. FIG. 1 shows the IR chart of the obtained polyquinazolone, and FIG. 2 shows $^1$H-NMR chart. As a result, the structural unit of Formula 29 was observed.

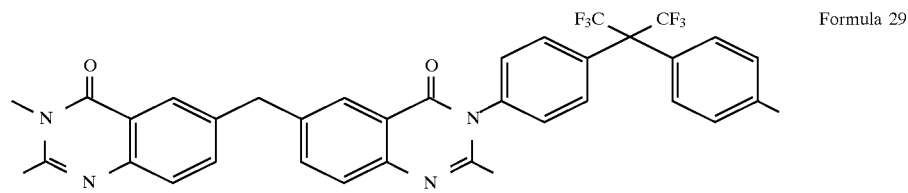

In the next step, 18 g of this polyquinazolone is dissolved in 92 g of N-methyl-2-pyrrolidone, and pressure-filtered by using filter paper having of an average pore diameter of 10 μm, so that foreign materials were removed. This polymer solution was cast-coated on a glass plate, and dried in a vacuum dryer for 5 hours at 110° C., and subsequently for 1 hour at 150° C., and 1 hour at 190° C. in order to remove the solvent. A polyquinazolone membrane was peeled off in water, vacuum-dried at 80° C., to be 20 μm thick. The gas permeability of this membrane is shown in Table 1.

Comparative Example 1

Comparative Example 1 was carried out in the same manner as Example 1 except that 18.4 g (0.055 mol) of bisoxazinone of the following Formula 30 and 10.9 g (0.055 mol) of diamine of Formula 31 were used.

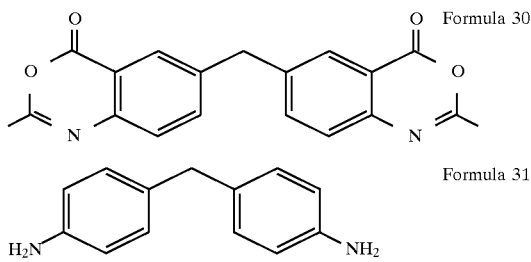

Formula 30

Formula 31

Table 1 shows the gas permeability of this membrane. As clearly shown in Table 1, the permeability (permeability coefficient) was remarkably low when fluorine atoms were not contained.

TABLE 1

| Performance Gas | Example 1 | | Comparative Example 1 | |
|---|---|---|---|---|
| | Permeant coefficient | Separation coefficient (/N₂) | Permeant coefficient | Separation coefficient (/N₂) |
| CO₂ | $1.2 \times 10^{-7}$ | 6.0 | $3.8 \times 10^{-10}$ | 21.1 |
| O₂ | $4.1 \times 10^{-8}$ | 2.0 | $7.6 \times 10^{-11}$ | 4.2 |
| N₂ | $2.1 \times 10^{-8}$ | 1 | $1.8 \times 10^{-11}$ | 1 |

*: [cm³ (STP) cm/cm² sec cmHg]

As clearly shown in Table 1, permeability (permeability coefficient) of a gas separation membrane was remarkably high when fluorine-containing polyquinazolone polymer was used.

As mentioned above, the fluorine-containing polyquinazolone polymer having the bisquinazolone unit of Formula 1 as its repeating unit has excellent chemical and heat resistance if the membrane is used for a separation membrane. The membrane also has excellent permeability and effective separability, and it is mechanically strong. This membrane can be used for various separation membrane purposes as well as other purposes.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claims is:

1. A fluorine-containing polyquinazolone polymer having a bisquinazolone unit represented by Formula 1 as a repeating unit;

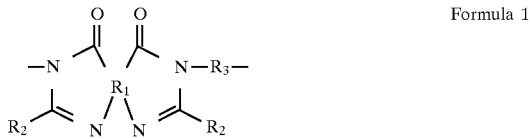

Formula 1 where $R_1$ indicates a tetravalent organic group, $R_2$ respectively indicate an alkyl group or an aromatic group, $R_3$ indicates a divalent organic group, and at least one of $R_1$ and $R_3$ indicates an organic group having at least one fluorine atom.

2. The fluorine-containing polyquinazolone polymer according to claim 1, wherein at least one of $R_1$ and $R_3$ of Formula 1 has at least one —$CF_3$ group.

3. The fluorine-containing polyquinazolone polymer according to claim 1, wherein $R_3$ of Formula 1 is at least one selected from the group consisting of Formulas 2, 3, and 4;

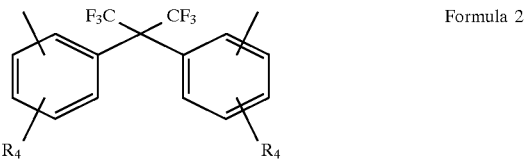

Formula 2 wherein $R_4$ respectively indicate hydrogen, an alkyl group having from one to four carbons, —OH, —COOH, —$SO_3H$, or metal chlorides of —COOH and —$SO_3H$.

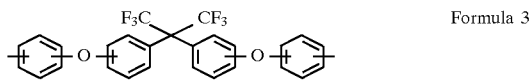

Formula 3

Formula 4

4. The fluorine-containing polyquinazolone polymer according to claim 1, wherein $R_1$ of Formula 1 is a tetravalent organic group having fluorine atoms of the structure represented by Formula 5.

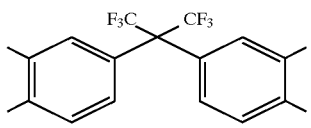

5. A separation membrane comprising the fluorine-containing polyquinazolone polymer according to claim 1.

6. The separation membrane according to claim 5, wherein said separation membrane is a gas separation membrane.

* * * * *